United States Patent

[11] 3,612,755

[72] Inventor Thomas Carter Tadlock, II
Chevy Chase, Md.
[21] Appl. No. 838,928
[22] Filed July 3, 1969
[45] Patented Oct. 12, 1971
[73] Assignee Dorothea Weitzner
New York, N.Y.
a part interest

[54] COLOR PATTERN GENERATOR
8 Claims, 4 Drawing Figs.

[52] U.S. Cl. 178/5.2 R
[51] Int. Cl. H04n 9/02
[50] Field of Search 178/5.2, 5.4, 5.4 E; 84/464

[56] References Cited
UNITED STATES PATENTS
2,804,500 8/1957 Giacoletto 178/5.4

*Primary Examiner*—Robert L. Griffin
*Assistant Examiner*—John C. Martin
*Attorney*—Yuter & Fields

ABSTRACT: A color pattern generator includes means for generating at least three images. A portion of each image is kaleidoscopically transformed to another image. A television camera converts each image to video signals that are intermixed in varying amplitudes to provide three color video signals that are fed to a color television receiver for display.

INVENTOR
THOMAS C. TADLOCK
BY
Yuter & Spiccens
ATTORNEYS.

INVENTOR
THOMAS C. TADLOCK
BY Yuter + Spiecens
ATTORNEYS.

COLOR PATTERN GENERATOR

This invention pertains to color pattern generators and more particularly to such generators utilizing television apparatus.

Over the years, artists have sought new media to present their works. Lately, artists have been utilizing the technology of science and engineering to create new art forms. From realistic portrayals of scenes by paint on canvas, the artist has proceeded to more and more abstract mixtures of color on canvas and to colored psychedelic light displays.

It is a general object of the invention to provide a new medium of art.

It is another object of the invention to provide a color pattern generator which permits a user to create new and unusual color displays.

Briefly, the invention contemplates apparatus for generating abstract color displays which comprises means for converting at least portions of first images to kaleidoscopic images which are in turn converted to first video signals. Means controllably mix the first video signals and derive therefrom at least two second video signals which are the source of at least two different color video signals. Means visually display color patterns related to the two different color video signals.

Other objects, the features and advantages of the invention will be apparent from the following detailed description when read with the accompanying drawing which shows presently preferred apparatus for practicing the invention. In the drawings.

Figures 1, 2:
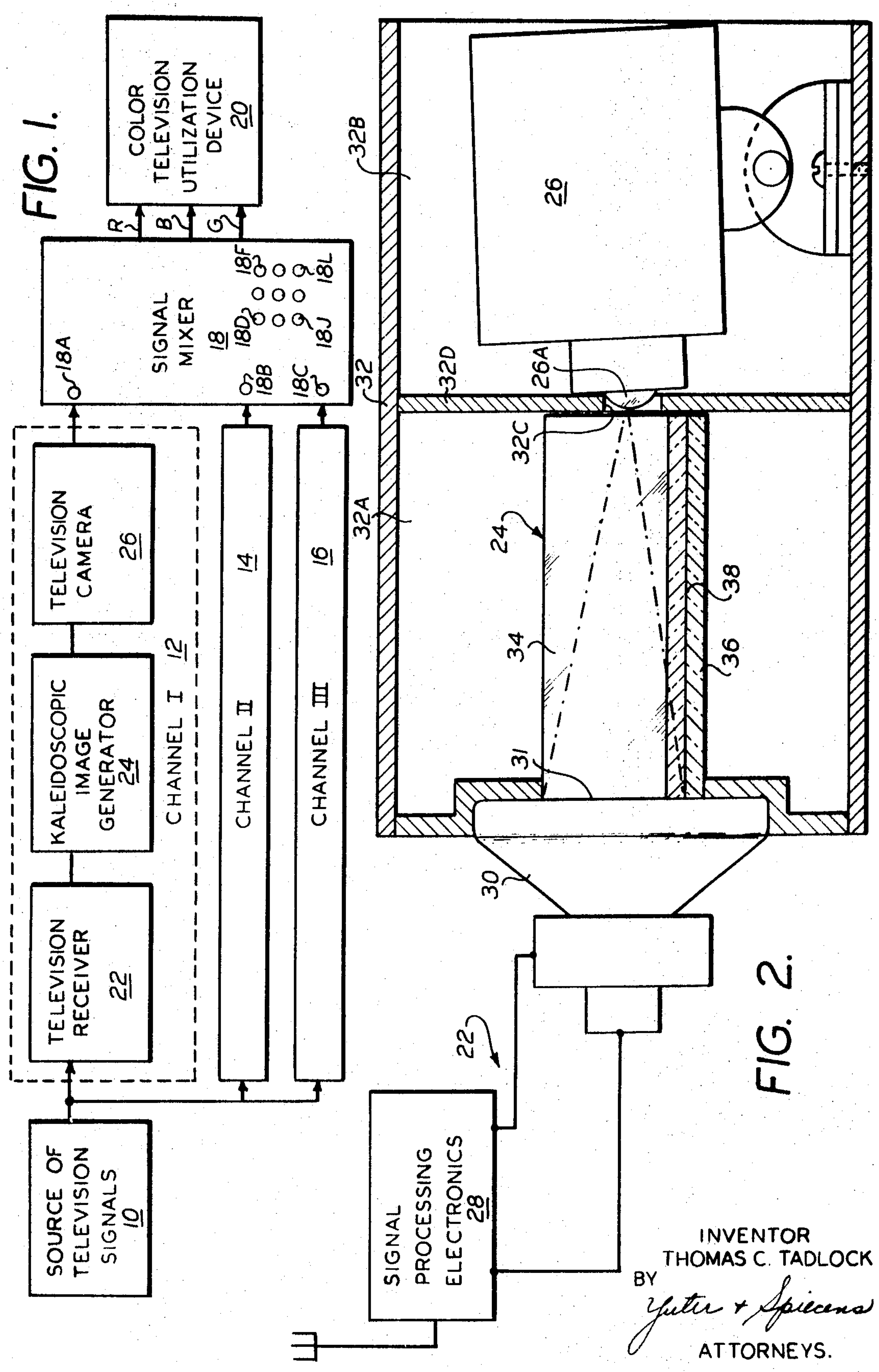
FIG. 1 is a block diagram of a color pattern generator in accordance with the invention.
FIG. 2 is a side view of the elements of one of the channels of the color pattern generator of FIG. 1.

The pattern generator as shown in FIG. 1, comprises a source of television signals 10, which can be an over-the-air or closed circuit television transmitter for transmitting conventional video signals representing pictures or scenes, feeds the signals to three identical channels 12, 14 and 16. Within the channels the conventional video signals are converted to visual images which are kaleidoscopically transformed to abstract visual images which are then converted to video signals. The video signals from each channel are fed to separate inputs of a signal mixer 18 where they are individually controllably attenuated and mixed in variable proportions to generate three video signals which are fed in parallel to color television utilization device 20. Device 20 can be, for example, a color television receiver whose three color guns each receive one of the signals, or can be a NTSC encoder feeding a color television monitor. By varying the positions of knobs 18A to 18L on signal mixer 18, different shades and patterns of color can be displayed by device 20.

Figure 3:
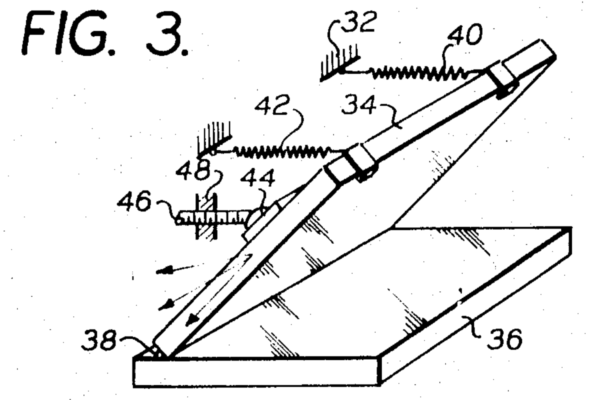
FIG. 3 is a perspective view of a kaleidoscopic mirror used in each of the channels of the color pattern generator.

The details of the color pattern generator will now be described. A typical channel 12 comprises a television receiver 22, a kaleidoscopic image generator 24 and a television camera 26 shown in greater detail in FIG. 2. Television receiver 22 can be a conventional television receiver having an electronics signal processing portion 28 and a cathode-ray tube 30. The face 31 of cathode-ray tube 30 is placed against an opening in a two-compartment housing 32. Within compartment 32A is kaleidoscopic image generator 24. Within compartment 32B is a television camera 26 such as a VIDICON whose input lens 26A is positioned in opening 32C of wall 32D and focused along the axis of kaleidoscopic image generator 24 to the face 31 of the cathode-ray tube 30. Kaleidoscopic image generator 24, shown in greater detail in FIG. 3, comprises planar mirrors 34 and 36 that are hingedly connected along the line 38. The reflecting faces of the mirrors are in face-to-face relationship. For certain angular displacements, such as 60° or 45° between the mirrors, kaleidoscopic transformations are obtained. In order to obtain the desired angles, the top edge of mirror 34 is connected to housing 32 via springs 40 and 42. Fixed to the back of mirror 34, via a ball and socket joint 44 is a rotatable threaded member 46 on which is a nut 48 fixed to chamber 32 by means not shown so that rotation of member 46 changes the angle between the mirrors.

Typical channel I 12 operates as follows. A portion of the image on the face 31 of cathode-ray tube 30 is reflected back and forth between mirrors 34 and 36 to present a kaleidoscopic image to the lens 26A of television camera 26. Camera 26 converts this image to video signals representing the image.

Figure 4:
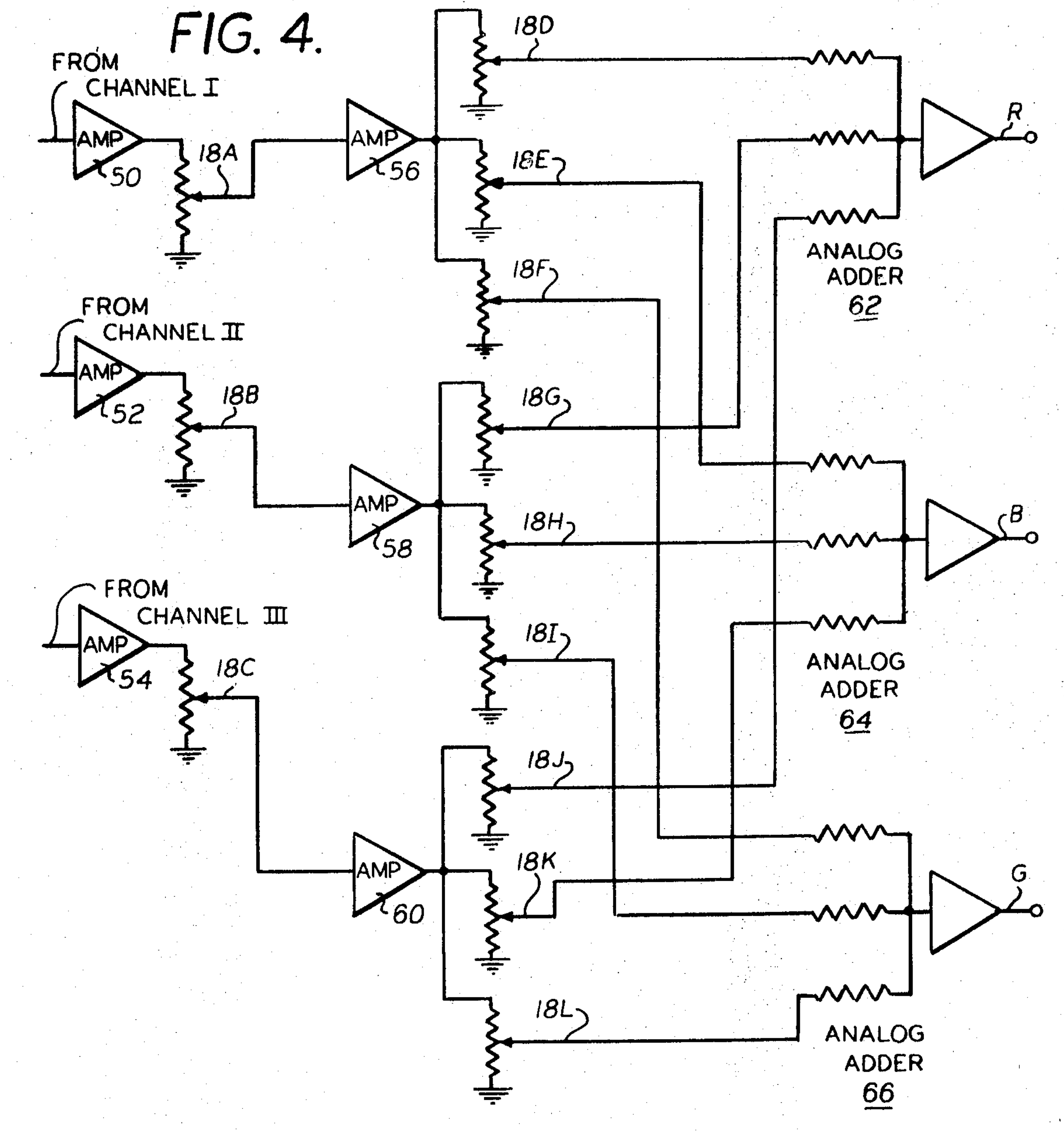
FIG. 4 is a schematic diagram of a signal mixer.

Signal mixer 18 shown in FIG. 4 comprises amplifiers 50, 52 and 54, each of which receives the video signal from one of the channels and feeds an amplified signal to a potentiometer 18A, 18B and 18C. It should be noted that the reference character of each potentiometer is the same as the reference character of the related knob in FIG. 1 since the knob moves the slider of the potentiometer. The function of the potentiometers 18A, 18B and 18C is to separately control the amplitude of each channel signal. The output of each potentiometer 18A, 18B and 18C feeds the inputs of amplifiers 56, 58 and 60 respectively. The output of each of the amplifiers 56, 58 and 60 feeds three potentiometers in parallel. For example, the output of amplifier 56 feeds potentiometers 18D, 18E and 18F to provide three parallel sources of the same video signal wherein the amplitude of the signal from each source is controllably variable. At this point there are present three sources of three video signals. These three video signals are now combined. Analog adder 62 receives the video signals from potentiometers 18D, 18G and 18J; adds these signals and transmits a signal on line R which becomes the source of a red-color video signal. Analog adder 64 receives the video signals from potentiometers 18E, 18H and 18K; adds these signals and transmit a signal on line B which is the source of a blue color video signal. Analog adder 66 receives the signals from potentiometers 18F, 18I and 18L; adds these signals and transmits a signal on line G which is the source of a green color video signal. Thus by varying the setting of the potentiometers, various amplitude red, blue and green video signals are obtained. It should be noted that although a specific embodiment of a signal mixer has been shown, other embodiments are equally applicable and fall within the scope of the invention.

What is claimed is:

1. Apparatus for generating abstract color displays comprising a source of at least a first image, means for converting at least a portion of said first image to kaleidoscopic images, means for converting said kaleidoscope images to first video signals, means for controllably mixing said first video signals, means for deriving at least two distinct second video signals from the mixed first video signals, said two distinct video signals being the sources of two different color video signals, and means for visually displaying color patterns related to said two different color video signals.

2. The apparatus of claim 1 wherein said means for converting at least said first image to kaleidoscopic images comprises three kaleidoscope mirror means, each forming a different kaleidoscopic image, said means for converting said kaleidoscopic images to first video signals comprises three television cameras each receiving the image from one of the kaleidoscopic mirror means, respectively, whereby three different first video signals are simultaneously generated, said mixing means mixing said first video signals in preselected proportions, and said deriving means deriving three distinct second video signals to provide a source of three different color video signals.

3. The apparatus of claim 1 wherein said display means comprises at least a color television receiver.

4. The apparatus of claim 3 wherein said display means further comprises a color video signal encoding means connecting said deriving means to said color television receiver.

5. The apparatus of claim 1 wherein said source of at least said first image is a television receiver having a cathode-ray tube screen.

6. The apparatus of claim 2 wherein said source of first images is three television receivers each having a cathode-ray tube screen wherein each of said kaleidoscopic mirror means is focused on a portion of a different one of the screens of said television receivers.

7. The apparatus of claim 2 wherein said mixing means includes means for independently controlling the amplitude of each first video signal.

8. The apparatus of claim 2 wherein said mixing means includes means for fanning out each of said first video signals into a group of three parallel first video signals, means for controllably changing the amplitude of each of said parallel first video signals independently, and three signal combining means, each of said signal combining means combining one of the parallel first video signals of each group to form one of the color video signals.